United States Patent [19]
Saito

[11] Patent Number: 5,854,689
[45] Date of Patent: Dec. 29, 1998

[54] IMAGE PROCESSING APPARATUS AND METHOD FOR PERFORMING SMOOTHING PROCESSING FOR EACH OF DIFFERENT COLORS

[75] Inventor: Tetsuo Saito, Tokyo, Japan

[73] Assignee: Canon Kabushiki Kaisha, Tokyo, Japan

[21] Appl. No.: 953,750

[22] Filed: Oct. 17, 1997

Related U.S. Application Data

[63] Continuation of Ser. No. 141,476, Oct. 22, 1993, abandoned.

[30] Foreign Application Priority Data

Oct. 28, 1992 [JP] Japan ................................. 4-290176
Jan. 29, 1993 [JP] Japan ................................. 5-013548

[51] Int. Cl.$^6$ ............................. H04N 1/10; H04N 1/46; H04N 1/58
[52] U.S. Cl. ............................. 358/298; 358/530
[58] Field of Search ............................. 358/296, 298, 358/515, 518, 521, 523, 524, 530–533; 382/162, 163, 167, 254, 260, 261, 264, 269; 395/109, 112, 115

[56] References Cited

U.S. PATENT DOCUMENTS

| | | | |
|---|---|---|---|
| 5,134,667 | 7/1992 | Suzuki | 382/269 |
| 5,206,719 | 4/1993 | Ikeda et al. | 358/518 X |
| 5,341,227 | 8/1994 | Kumashiro | 358/533 |
| 5,357,353 | 10/1994 | Hirota | 358/530 |
| 5,357,583 | 10/1994 | Sato et al. | 382/269 |
| 5,381,522 | 1/1995 | Seto et al. | 395/143 |
| 5,465,157 | 11/1995 | Seto et al. | 358/298 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

A color printer for high-quality image recording. The printer comprises printer controller 200 having image memories (video RAM's) and printer engine 300. Memory selector 2005 changes over the image memory for forming image data by color component, and outputs a color designation signal CRCD indicative of a currently-used image memory. The CRCD signal value is "00" to indicate Y image memory 2001; "01", M image memory 2002; "10", C image memory 2003; and "11", K image memory 2004. Thus the CRCD indicates the color of the current image memory. Upon smoothing, VDO signal processor 302 changes over the smoothing logic based on the CRCD signal, accordingly, an appropriate smoothing logic for each color component image data can be applied.

9 Claims, 20 Drawing Sheets

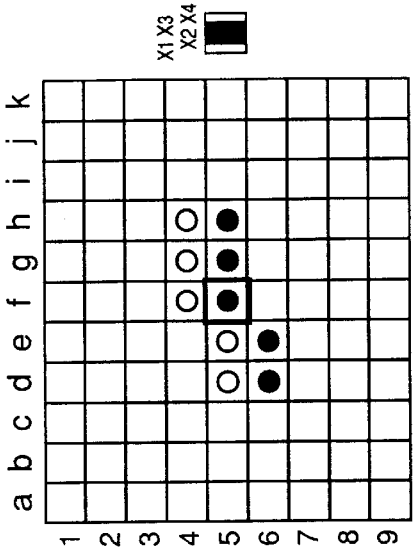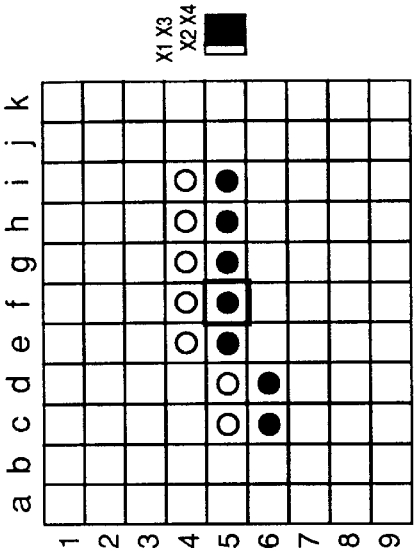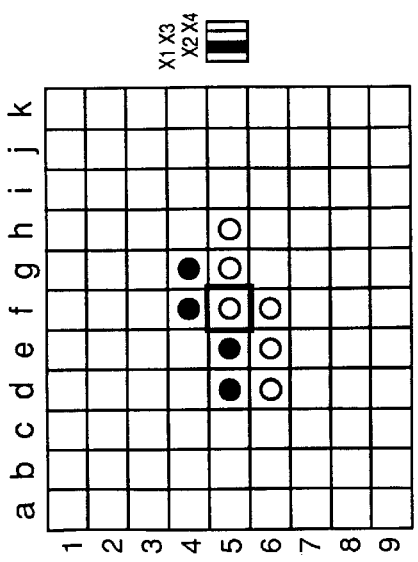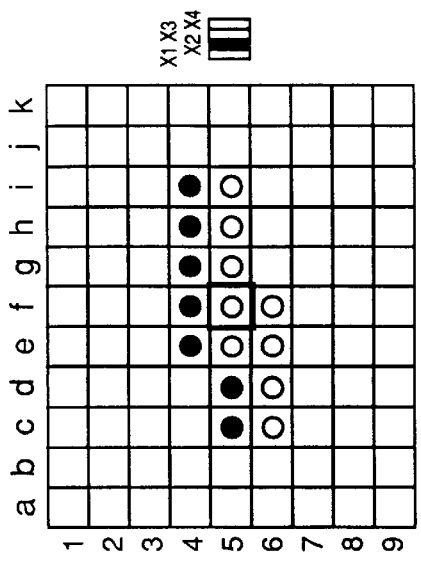

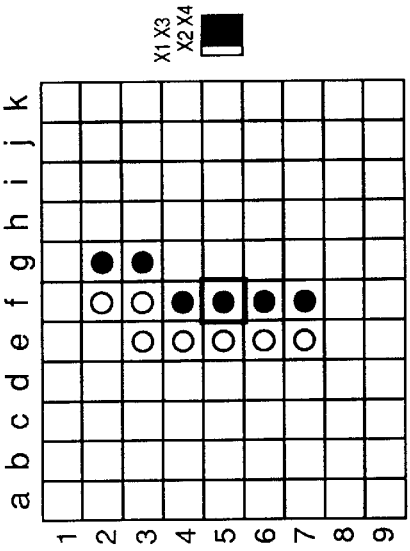
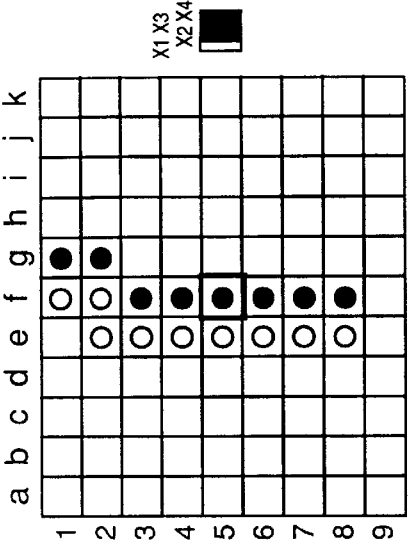
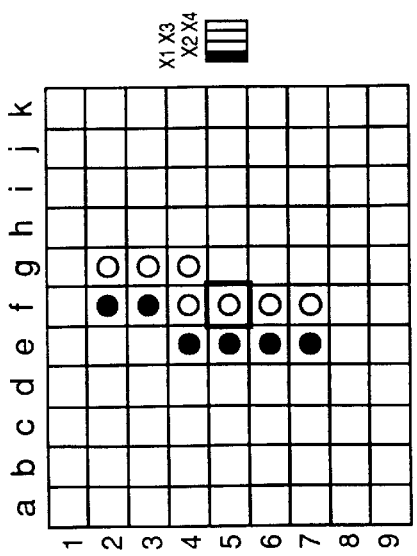
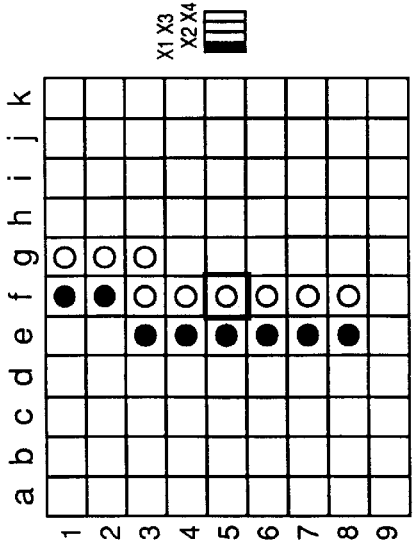

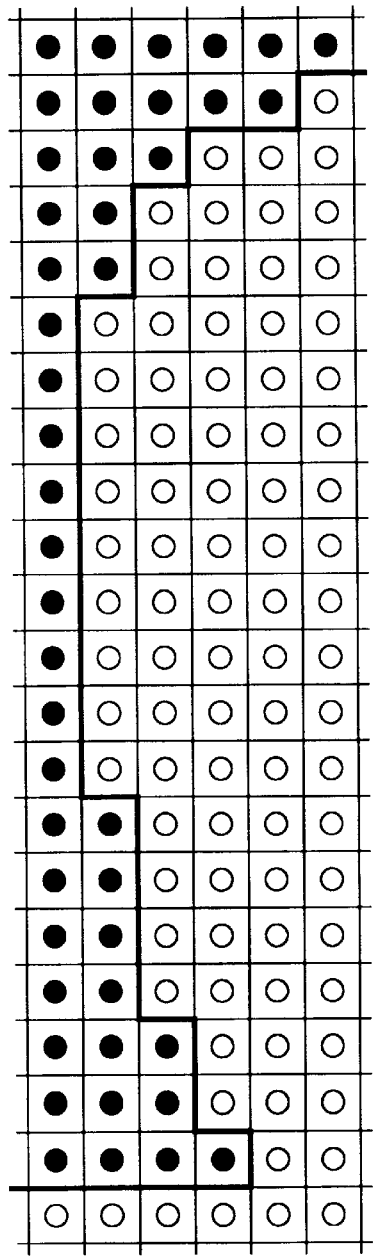
F I G. 6A
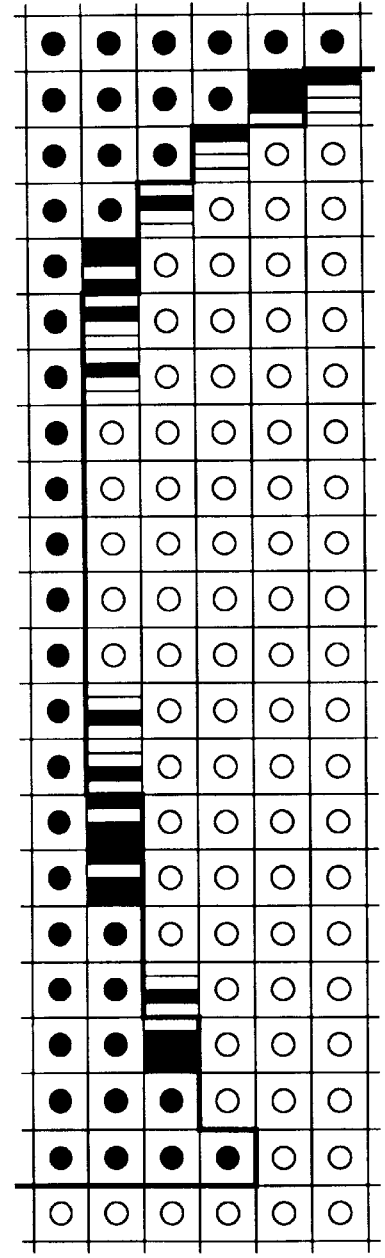
F I G. 6B

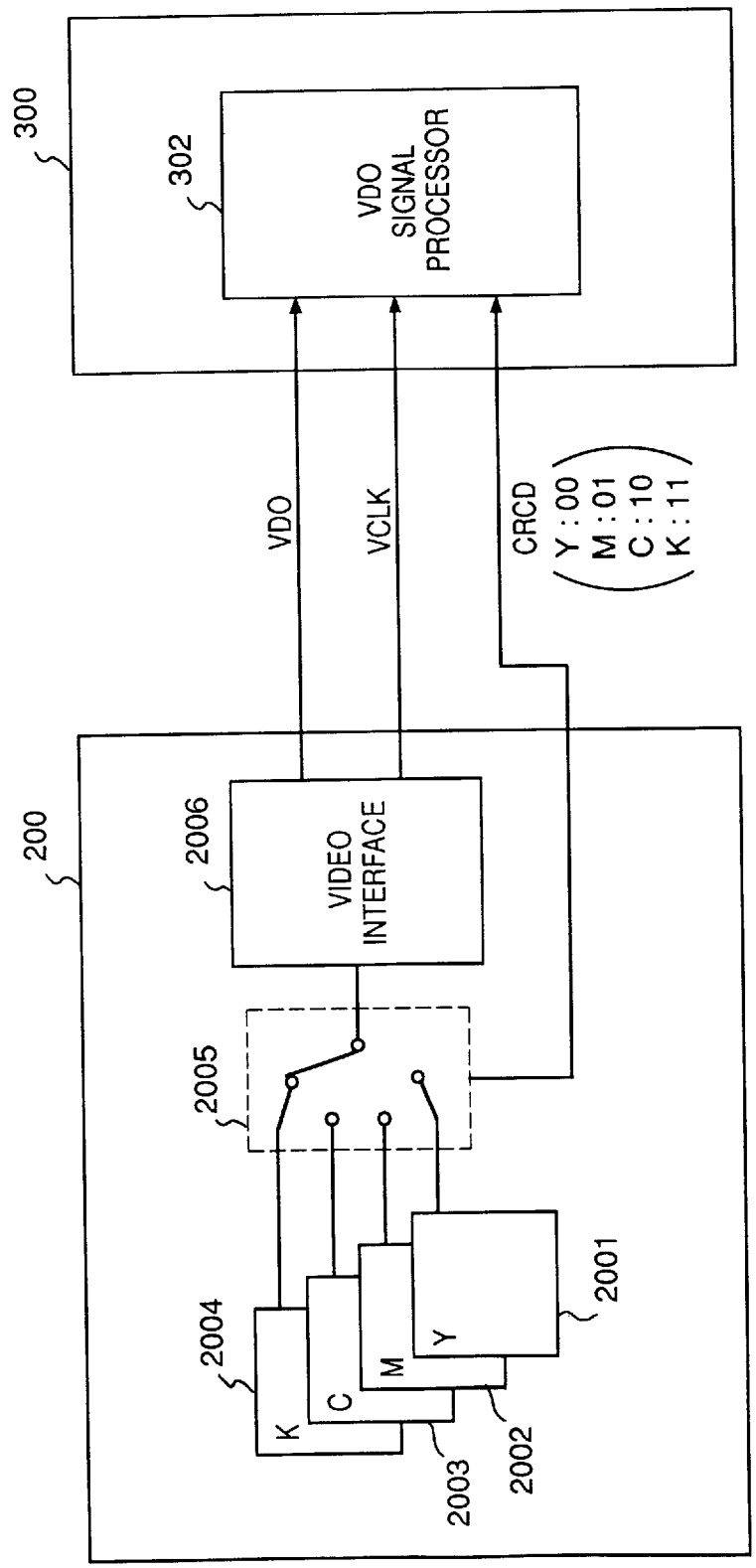

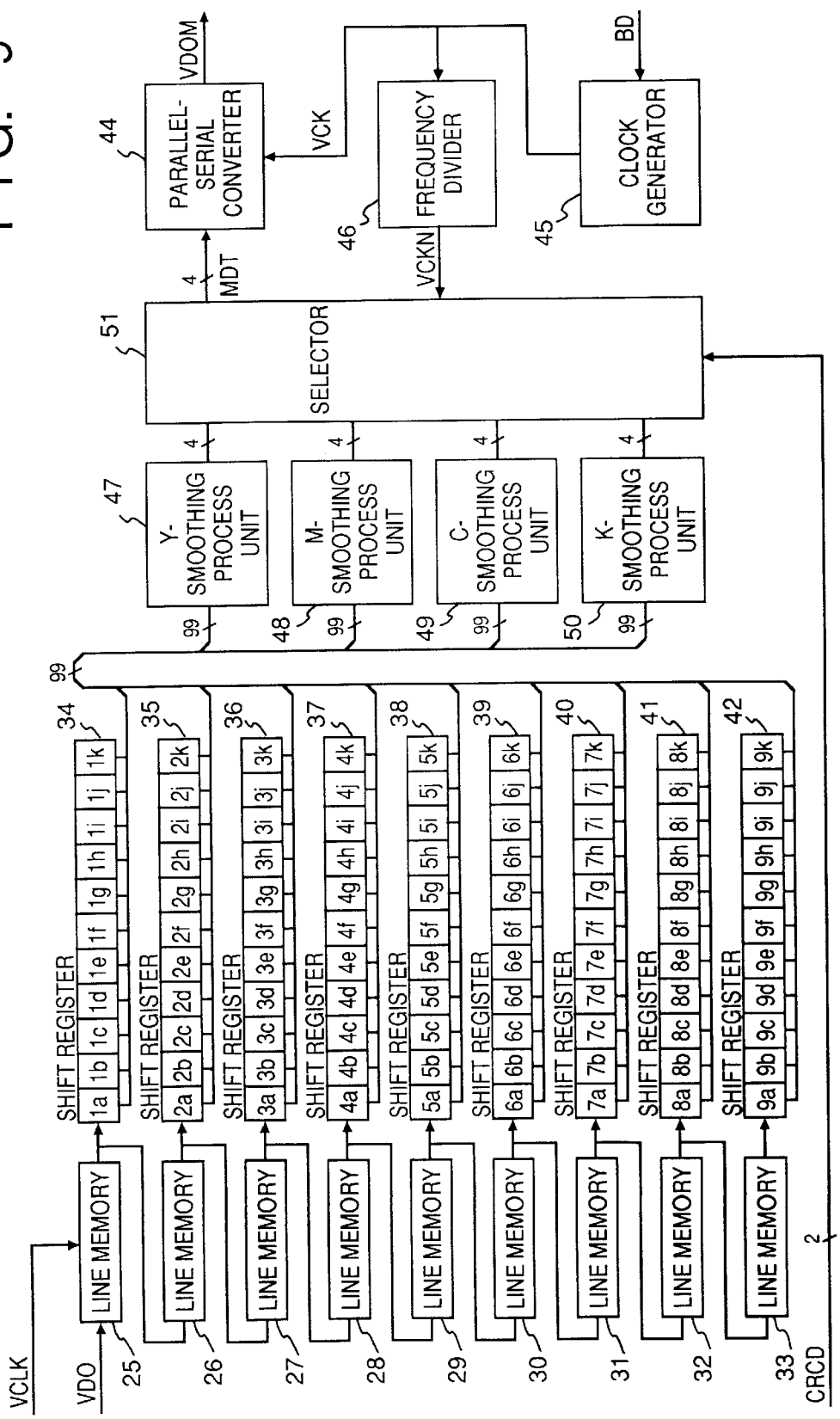

IMAGE PROCESSING APPARATUS AND METHOD FOR PERFORMING SMOOTHING PROCESSING FOR EACH OF DIFFERENT COLORS

This application is a continuation of application Ser. No. 08/141,476 filed Oct. 22, 1993, now abandoned.

BACKGROUND OF THE INVENTION

The present invention relates to an image processing apparatus and method and, more particularly, to an image processing apparatus and method in an image recording device such as a laser-beam printer.

Recently, recording devices utilizing electrophotographic techniques such as laser-beam printing have been widely used as computer output devices. These devices have many merits, including high image quality and low-noise. Especially, 300 dpi printing density is a main factor of the rapid development in desk-top publishing (DTP) from the point of high image quality. Nowadays a product which responds to users' further request for improvement in image quality has been introduced. This device performs smoothing on a character image by modulating printing pixels to improve the printing density in the main-scanning direction, and prints the smoothed image.

Regarding this smoothing technique, the present applicant has filed U.S. patent application Ser. No. 07/838,871 (filed on Feb. 21, 1992) now U.S. Pat. No. 5,465,157, U.S. patent application Ser. No. 07/855,083 (filed on Mar. 20, 1992), U.S. Pat. No. 5,586,227, U.S. patent application Ser. No. 07/855,104 (filed on Mar. 20, 1992), now U.S. Pat. No. 5,381,522, and U.S. patent application Ser. No. 08/012,634 (filed on Feb. 3, 1993), U.S. Pat. No. 5,742,317.

However, the above technique only relates to a monochrome-image printer. At present, a full-color printer which performs such high-image-quality processing is awaited.

For this reason, the present applicant has introduced smoothing upon color image data in U.S. patent application Ser. No. 08/083,497 (filed on Jun. 29, 1993). However, this smoothing technique for color image data still requires further improvement.

SUMMARY OF THE INVENTION

The present invention has been made in consideration of the above situation, and has as its first object to provide an image processing apparatus and method in a full-color printer to print out a high-image-quality processed color component image by smoothing respective color components.

According to the present invention, the first object is attained by providing an image processing apparatus comprising: storage means for storing color image data by color component; smoothing means for smoothing the color image data by color component; and changing means for changing a logic for smoothing used by the smoothing means by color component.

It is the second object of the present invention to prevent the degradation of image quality caused by smoothing an image that does not need smoothing.

According to the present invention, the second object is attained by providing an image processing apparatus comprising: storage means for storing color image data by color component; designation means for designating the color image data of one color component to be smoothed; smoothing means for smoothing the color image data of the color component designated by the designation means; and output means for, upon forming an image of the color image data of the color component designated by the designation means, outputting the color image data smoothed by the smoothing means, while upon forming an image of the color image data of another color component, outputting image data which has not been smoothed.

It is the third object of the present invention to provide an image processing apparatus and method which enables designation of a smoothing level for each color component from an external device, and performs a desired fine smoothing on each image data.

According to the present invention, the third object is attained by providing an image processing apparatus comprising: storage means for storing color image data by color component; designation means for designating a smoothing level with respect to each of the color image data; smoothing means for changing a level of smoothing by color image data in accordance with the smoothing level designated by the designation means; and output means for outputting the color image data smoothed by the smoothing means.

Further, it is the fourth object of the present invention to provide an image processing apparatus and method which detects an operation environment, e.g., humidity in the apparatus, and automatically changes the smoothing level in accordance with the detected environment.

According to the present invention, the fourth object is attained by an image processing apparatus comprising: storage means for storing color image data by color component; measurement means for measuring recording operation environment in a recording device for recording-outputting the color image data; designation means for designating a smoothing level in accordance with a measurement result by the measurement means; smoothing means for respectively smoothing the color image data based on the smoothing level designated by the designation means; and output means for outputting the color image data smoothed by the smoothing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4L illustrate pattern examples as the object of smoothing with an object pixel output pattern in the first embodiment;

FIG. 6A is an enlarged view of area S that is a part of the image data in FIG. 5;

FIG. 6B illustrates the smoothed area S;

FIG. 8 is a block diagram showing the configuration of a control system of a color printer according to a second embodiment;

FIG. 9 is a block diagram showing the construction of a VDO signal processor in the second embodiment;

DETAILED DESCRIPTION OF THE PREFERRED EMBODIMENTS

Preferred embodiments of the present invention will be described in detail in accordance with the accompanying drawings.

<First Embodiment>

Figure 1:
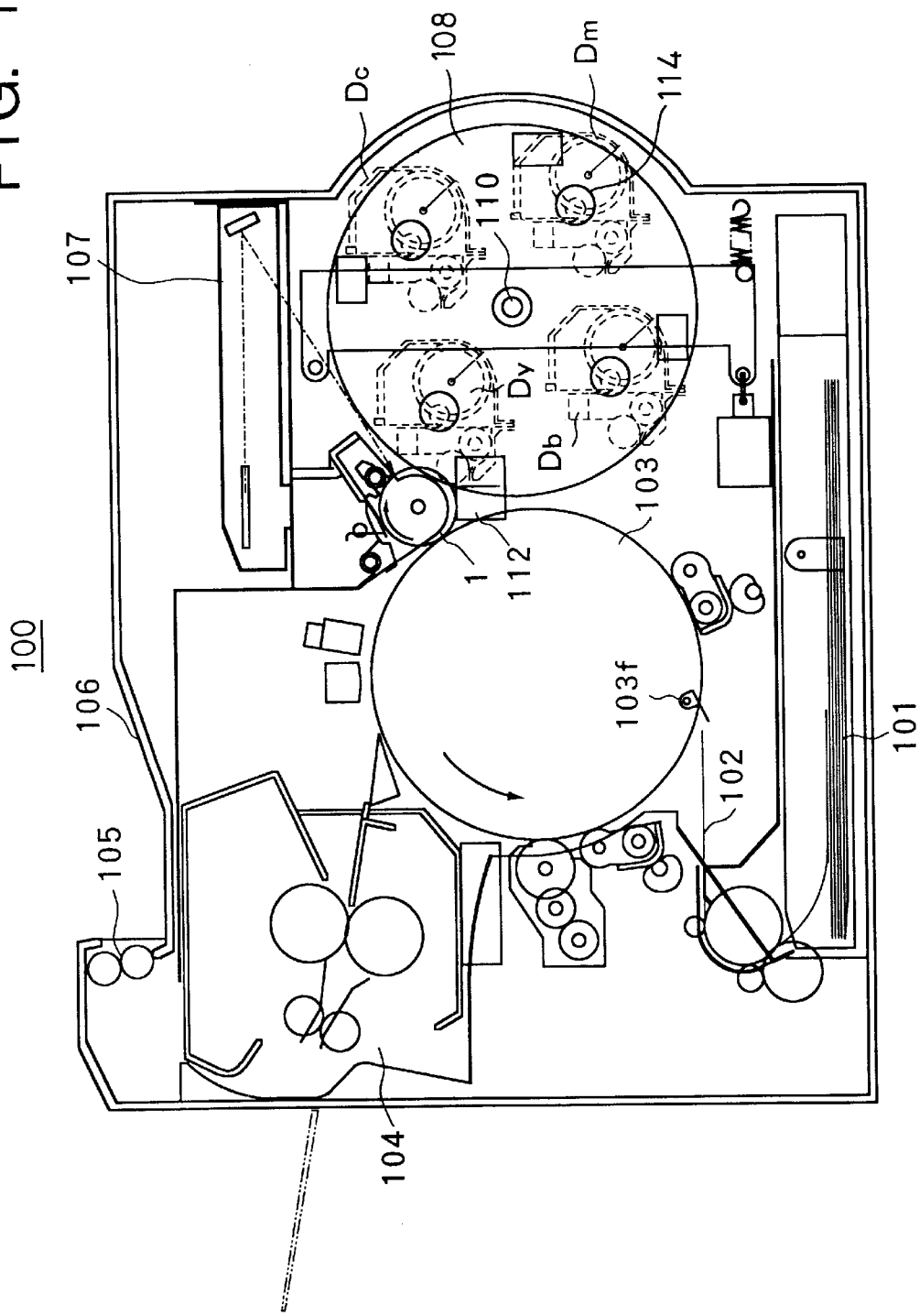
FIG. 1 is a cross-sectional view of a laser-beam full-color printer according to the embodiments of the present invention.

FIG. 1 is a cross-sectional view of laser-beam full-color printer 100 according to the embodiments of the present invention.

In FIG. 1, paper feeder 101 feeds recording paper 102, and gripper 103f of transfer drum 103 grips the end of the recording paper 102 and holds the paper 102 around the circumference of the transfer drum 103. Optical unit 107 forms latent images for the respective color components on image holder (electrostatic drum) 1 of drum-cleaner unit C. Developing-selection mechanism comprises developing cartridges Dy, Dc, Dm and Db for developing images corresponding to yellow, magenta, cyan and black color components respectively, developing cartridge holder 108 which is rotatable around axis 110 parallel to the axis of the image holder 1, guides 114 for the developing cartridge holder 108 to hold developing cartridges, press member 112 for aligning the developing cartridges in the image holder 1 direction of the drum-cleaner unit C, control-drive mechanism for selectively moving the developing cartridges by turning the developing cartridge holder 108, and driving mechanism for holding the respective developing cartridges at specific positions.

Developed images of respective color components obtained by the developing-selection mechanism are transferred to the recording paper 102 on the transfer drum 103. Thus, a multi-color component image is formed and separated from the transfer drum 103. Thereafter, fixing unit 104 fixes toner, and paper discharger 105 discharges the recording paper 102 to paper discharge tray 106.

As described above, the full-color printer repeats the printing sequence, the same as that of a monochrome printer, with respect to Y, M, C and K color component components, i.e., development on the electrostatic drum is performed four times by the time the recording paper 102 is discharged. That is, a printer controller, to be described later, sends image data VDO respectively corresponding to Y, M, C and K, the four color components.

Smoothing processing of the present embodiment will be described with reference to FIGS. 2 and 3.

Figure 2:
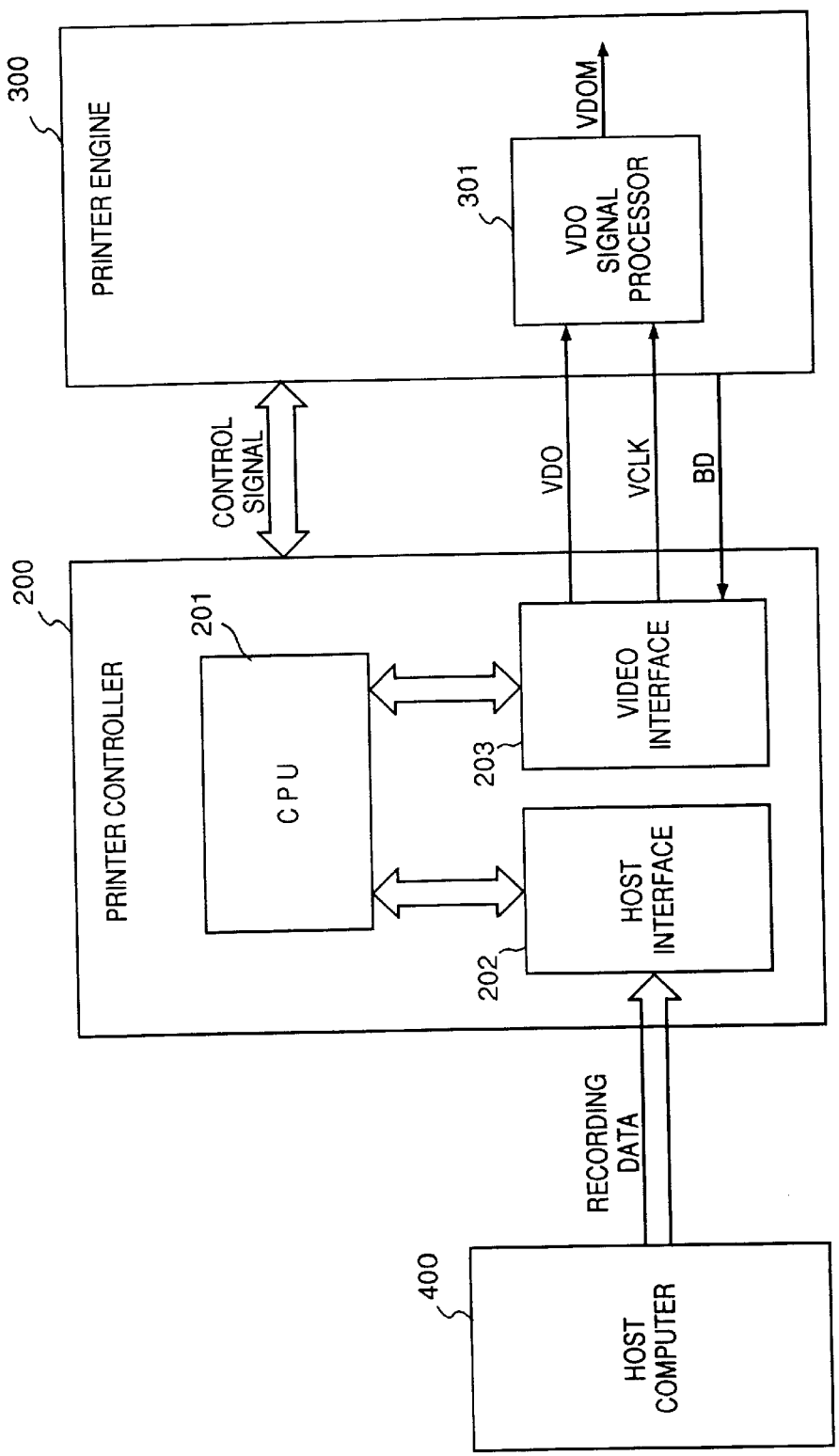
FIG. 2 is a block diagram showing the configuration of a control system of the color printer in the first embodiment.

FIG. 2 is a block diagram showing the configuration of a control system of the color printer according to the first embodiment. In FIG. 2, reference numeral 200 denotes a printer controller which develops recording data inputted from an external device such as host computer 400 into image data and sequentially outputs the data as a video signal VDO to printer engine 300. VDO signal processor 301 in the printer engine 300 receives the signal VDO with its synchronous clock VCLK from the printer controller 200, performs smoothing on the image data and outputs the data as smoothed video signal VDOM. Image recording is made using this signal VDOM.

The printer controller 200 comprises CPU 201, host interface 202 and video interface 203. The CPU 201 has a ROM (not shown) in which various control programs for controlling the color printer 100 are stored. The host interface 202 receives recording data from the external host computer 400. The CPU 201 develops the received recording data into image data and stores the data into a video RAM (not shown). The video interface 203 outputs various signals for image formation such as the video signal VDO obtained from image data stored in the video RAM and the clock signal VCLK of the video signal VDO to the printer engine 300. Note that the image data stored in the video RAM are respectively corresponding to color components (data for Y, M, C and K). Signal BD is a beam detection signal used as a synchronizing signal in a main-scanning direction. Control signal is used for controlling the respective elements such as a driving motor (not shown) in the printer engine 300.

Figure 3:
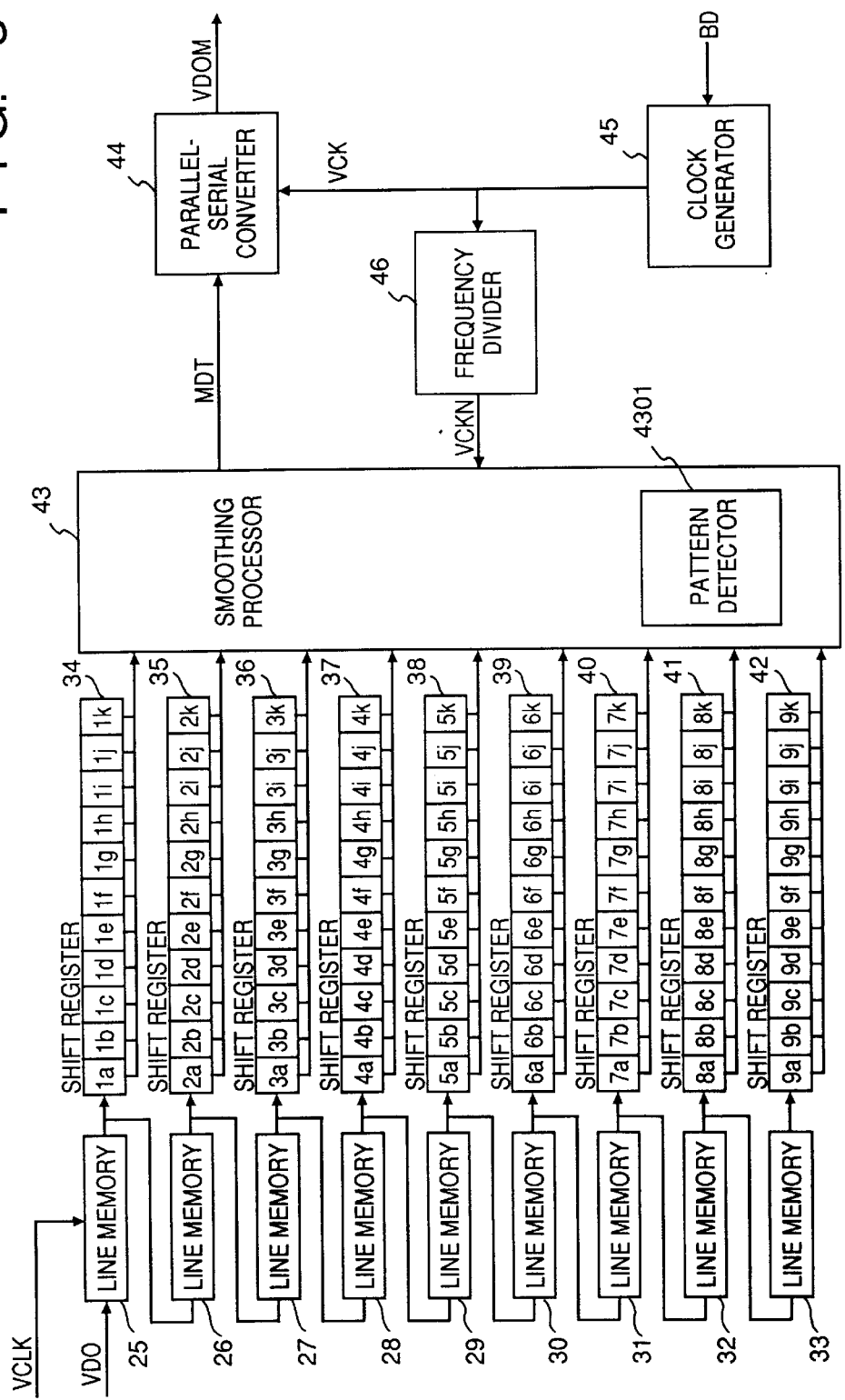
FIG. 3 is a block diagram showing the construction of a VDO signal processor in the first embodiment.

FIG. 3 is a block diagram showing the construction of the VDO signal processor 301 in FIG. 2. In FIG. 3, reference numerals 25 to 33 denote line memories for sequentially shifting and storing input image signal VDO in synchronization with its clock signal VCLK. The respective line memories have memory capacity for storing dot information of a main-scanning length of a recording page (image). The line memories are connected in the order from the line memory 25, the line memory 26, the line memory 27, to the line memory 33, for storing the main-scanning length dot information for nine lines in the subscanning direction. Numerals 34 to 42 denote shift registers, respectively provided corresponding to the line memories 25 to 33, for inputting the output data from the line memories 25 to 33. The shift registers 34 to 42 are eleven bit registers, and as shown in FIG. 3, form have an 11 dots×9 subscanning lines (99 bits) dot matrix memory. It should be noted that in this dot matrix memory, the central dot 5f is defined as the object dot.

Numeral 43 denotes a smoothing processor for detecting a feature of data stored in a dot matrix memory, changing the object pixel 5f depending upon necessities, and performing smoothing. The smoothing processor 43 inputs the data in the respective bits of the shift registers 34 to 42 (i.e., the 99 bit dot matrix data (1a–9k)). The smoothing processor 43 performs smoothing on pixel data of the object pixel 5f in accordance with the feature of the dot matrix data and generates a four-bit parallel signal MDT. The parallel signal MDT outputted from the smoothing processor 43 enters parallel-serial converter 44, which converts the parallel signal MDT into the serial signal (smoothed video signal) VDOM to be used by a laser driver (not shown) for driving a laser. Note that in this embodiment, the parallel signal MDT comprises four bits $X_1$ to $X_4$. That is, the MDT signal is obtained by dividing one object pixel 5f into four pixel data. Then the object pixel is modulated in a main-scanning direction by driving the laser in accordance with the MDT signal.

The above smoothing processing is repeated by sequentially shifting the object pixel 5f in the main-scanning direction, thus data for one line in the main-scanning direction is processed.

Numeral 45 denotes a clock generator for inputting the main-scanning synchronous signal BD and generating signal VCK as a clock signal synchronizing with the signal BD. As the parallel signal MDT comprises four $X_1$ to $X_4$ bits obtained from dividing one pixel data by four, the clock signal VCK has a frequency quadruple of clock $f_0$ necessary for e.g. 300 dpi recording. The serial signal VDOM is sequentially transferred synchronizing with the clock VCK. Numeral 46 denotes a frequency divider for dividing the VCK outputted from the clock generator 45 by four and generating clock VCKN. The frequency divider 46 outputs the clock VCKN to the smoothing processor 43, which outputs the parallel signal MDT synchronizing with the clock VCKN.

The operations in FIG. 3 are as follows. When the printer engine 300 receives 300 dpi image signal VDO (image dot data) from the printer controller 200, the image dot data is sequentially stored into the line memories 25 to 33. At the same time, 11 dots×9 subscanning lines dot matrix information out of the image dot data is stored into the shift registers 33 to 42. Thereafter, the smoothing processor 43 detects the feature of the dot matrix information, and it generates changing data (MDT) comprising four data $X_1$ to $X_4$ by dividing the object pixel by four in main scanning direction in accordance with the detected features, and printing is made with the MDT data.

Next, the smoothing processing according to the present embodiment will be described below.

Figure 4E:
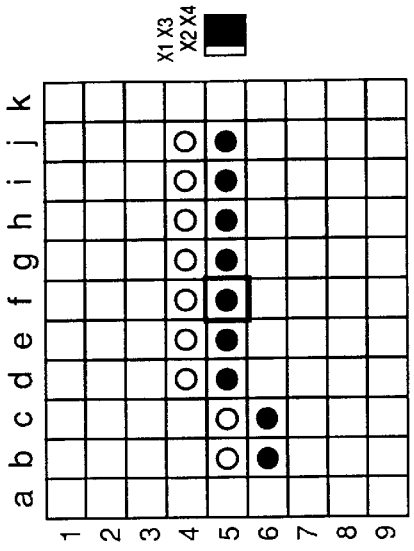
Figure 4F:
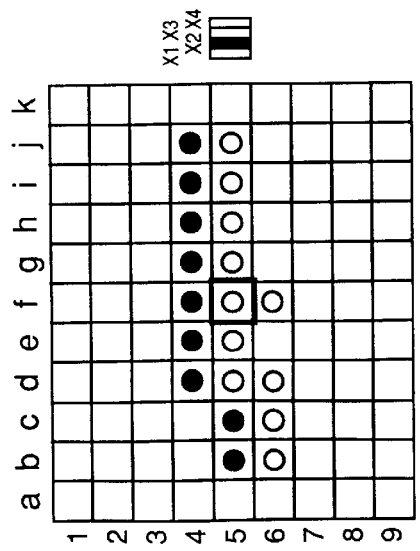
Figure 4G:
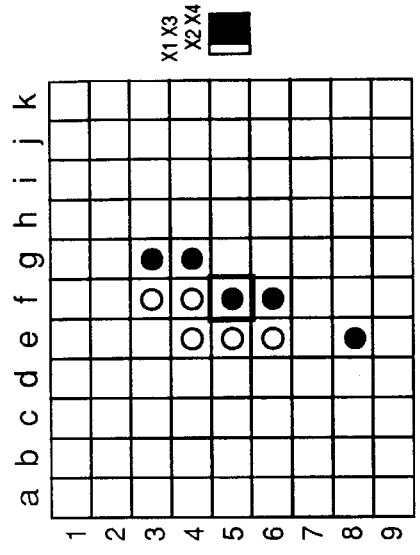
Figure 4H:
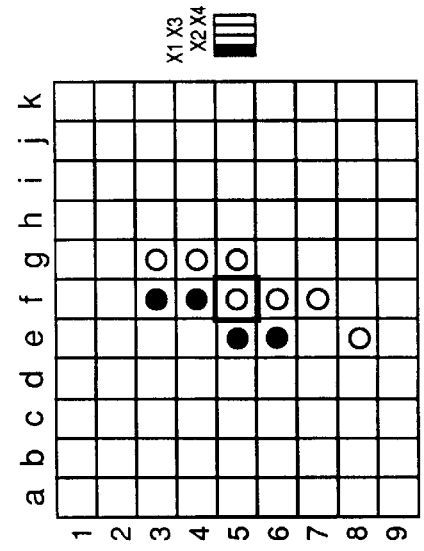
Figure 5:
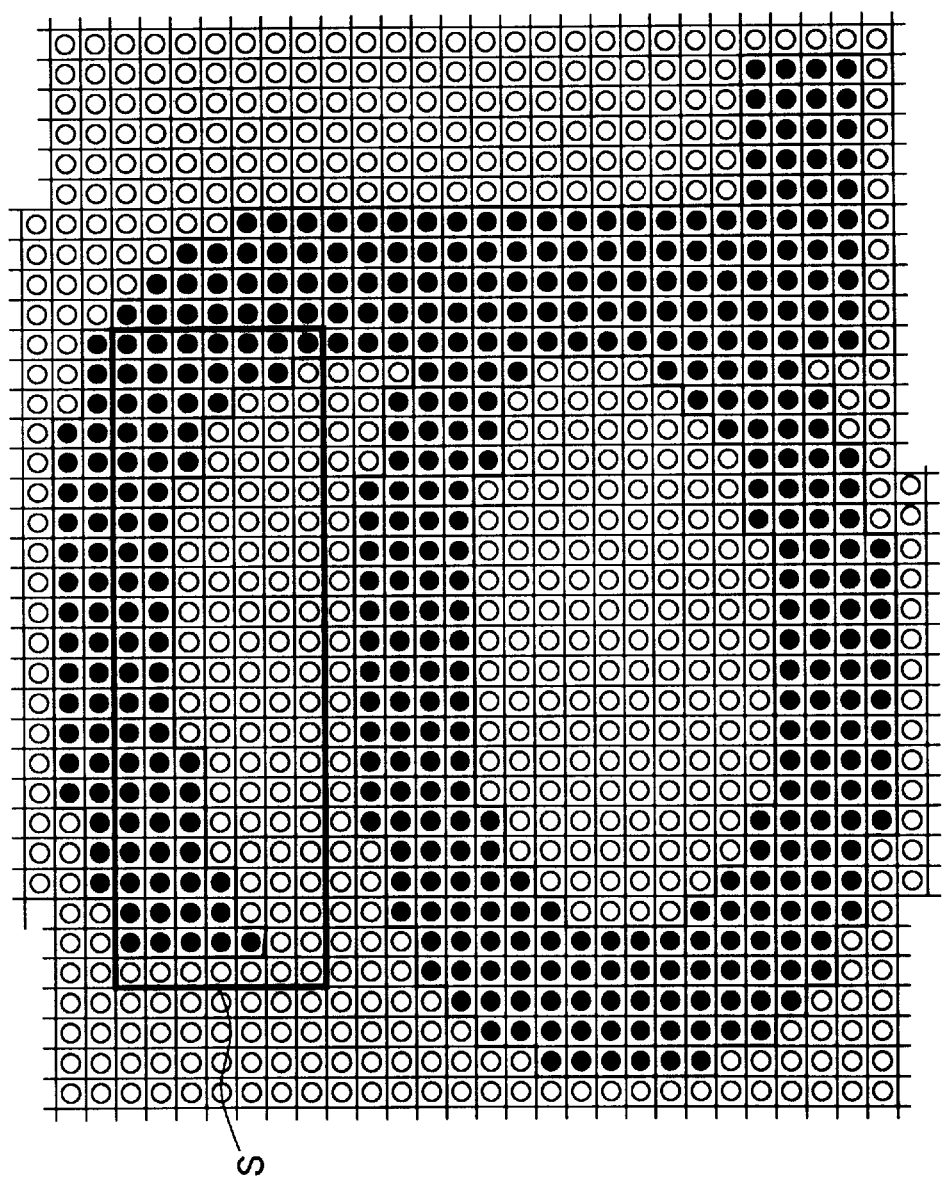
FIG. 5 illustrates an image data of character "a"

FIGS. 4A to 4L illustrate patterns to be the object of the smoothing with an object pixel output pattern. FIGS. 5, 6A and 6B are diagrams for explaining the smoothing processing.

The smoothing processor 43 has pattern detector 4301 (FIG. 3) for detecting patterns as shown in FIGS. 4A to 4L. When the pattern detector 4301 detects one of the patterns as shown in FIGS. 4A to 4L that corresponds to the pattern of the dot matrix data, the smoothing processor 43 determines the MDT signal as Xi ($1 \leq i \leq 4$) shown at the right side of the corresponding pattern.

For example, part S of the dot matrix of character "a" in FIG. 5 is smoothed as shown in FIGS. 6A and 6B, and printing is performed.

Figure 7:
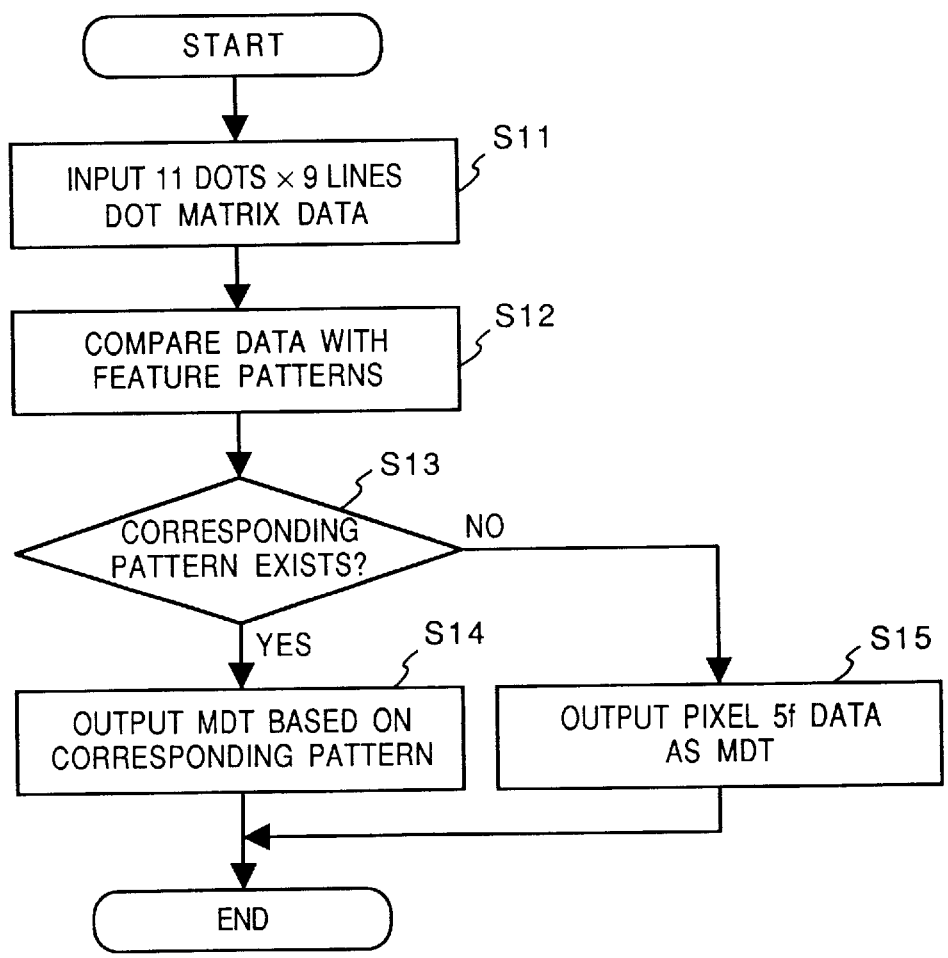
FIG. 7 is a flowchart showing the smoothing in the first embodiment.

The smoothing processing will be described in detail with reference to FIG. 7 which is a flowchart showing the operation of the smoothing processor 43 in the first embodiment. In step S11, the smoothing processor 43 inputs 11 dots×9 lines dot matrix memory image data. In step S12, the pattern detector 4301 compares the input image data with the patterns as shown in FIGS. 4A to 4L and examines whether there is a pattern which corresponds to the input image data or not. If YES, i.e., there is a pattern corresponding to the image data, the process proceeds to step S14 in which the Xi output pattern of the corresponding pattern is outputted as the parallel signal MDT. If NO, the MDT signal is generated with pixel data of the current object pixel 5f and outputted.

The smoothing processor 43 executes the above operation with respect to all the color components. For example, in FIG. 2, Y (yellow) image signal VDO from the printer controller 200 is received, and the above smoothing is performed. The recording operation as described with reference to FIG. 1 is performed and the smoothed yellow image is transferred on the recording paper 102. The recording paper 102 turns around the transfer drum 103, next, an M (magenta) image is formed, i.e., M image signal VDO is received from the printer controller 200, then the smoothing is performed similarly to the Y image signal, and the M image is transferred on the recording paper 102. The other color component images (C (cyan) and K (black)) are formed in this manner. Thereafter, the fixing unit 104 fixes toner, and a full-color component image obtained from this high-image-quality processing is printed out.

As described above, according to the first embodiment, in a full-color printer, the smoothing processes upon the respective color component image data realize printing of a high-image-quality processed color image.

[Second Embodiment]

In the first embodiment, the Y, M, C and K color component data are processed by the same smoothing logic. As the color components have different visual sensitivities, the same smoothing is not the most appropriate processing to each of the color components, thus resulting in degradation of image quality. In this embodiment, to solve the above problem, an image processing apparatus which implements different smoothing logics respectively appropriate to the Y, M, C and K color components will be described.

FIG. 8 is a block diagram showing the configuration of a control system of a color printer according to the second embodiment. In FIG. 8, numerals 2001 to 2004 denote image memories (video RAM's) for storing image data respectively for Y, M, C and K color component image. Numeral 2005 denotes a memory selector for sequentially switching the image memory to form image data by color component. The selector 2005 outputs a signal indicative of a currently-selected image memory, i.e., color component designation signal CRCD. When the memory 2001 for the Y image is employed, CRCD signal value is "00"; when the memory 2002 for the M image is employed, the CRCD value is "01"; when the memory 2003 for the C image is employed, the CRCD value is "10"; and when the memory 2004 for the K image is employed, the CRCD value is "11". In this manner, the CRCD signal indicates the color of the image data currently being processed.

Numeral 302 denotes a VDO signal processor in the second embodiment. Hereinbelow, the VDO signal processor 302 will be described with reference to FIG. 9 showing the construction of the VDO signal processor 302. In FIG. 9, elements corresponding to those in FIG. 3 have the same reference numerals and the explanations of these elements are omitted.

Numerals 47 to 50 denote smoothing process units for the respective color components, for respectively performing smoothing appropriate to the corresponding color component. Numeral 51 denotes a selector for selecting one of parallel signals inputted from the smoothing process units 47 to 50 in accordance with the color component indicated by the CRCD signal value, and outputting the selected signal as the MDT signal.

The operations in the second embodiment are as follows.

Similarly to the first embodiment, the line memories 25 to 33 and the shift registers 34 to 42 constitute a dot matrix memory, and dot matrix data of a predetermined number of pixels is stored. The dot matrix data is inputted into the Y-smoothing process unit 47, the M-smoothing process unit 48, the C-smoothing process unit 49 and the K-smoothing process unit 50, and formed to be four-bit pixel data at the respective process units. These four-bit pixel data are inputted into the selector 51 as the parallel signal. Assuming that the signal CRCD value at this time is "00" indicating that the signal VDO is corresponding to the Y color component, the selector 51 selects the four bit output from the Y-process unit 47 and outputs the data as the signal MDT. The parallel-serial converter 44 converts the signal MDT into serial data and outputs the data as the image data VDOM.

When an image signal VDO corresponding to the M color component is received, the CRCD value becomes "01" indicating that the VDO corresponds to the M color component. The selector 51 selects the output from the M-process unit 48 and outputs the data as the signal MDT. The parallel-serial converter 44 converts the parallel signal MDT into a serial signal and outputs the signal as the image data VDOM. The similar processings are performed with respect to the VDOM signals for the C and K color components, thus smoothings respectively appropriate are performed on these signals, and then a full-color image is printed out.

Figure 10A:
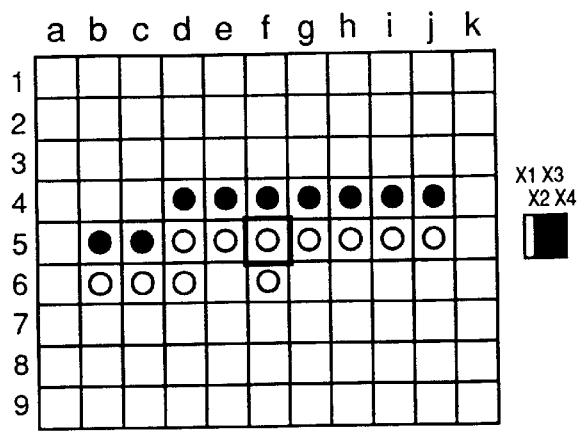
FIGS. 10A to 10C illustrate pattern examples as the object of smoothing in the second embodiment.
Figure 10B:
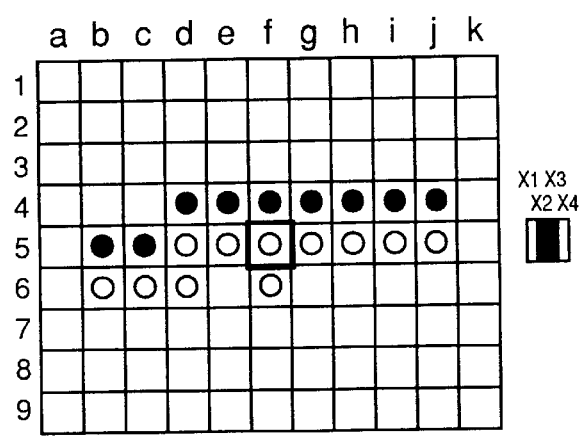
Figure 10C:
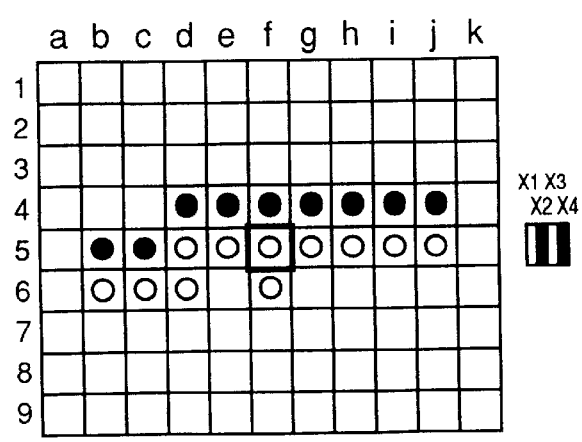

It should be noted that the smoothing process units 47 to 50 respectively for the Y, M, C and K color components have different smoothing logics. For example, the smoothing logic for the pattern shown in FIG. 4E is used by the K-process unit 49. The Y, M and C-process units use logics as shown in FIGS. 10A to 10C. Compared with the K color component, the Y, M and C color components have lower visual sensitivities. For this reason, the logics in FIGS. 10A to 10C, tend to deepen the YMC colors (i.e., to raise respectively smoothing levels) to improve smoothing effects.

Figure 11:
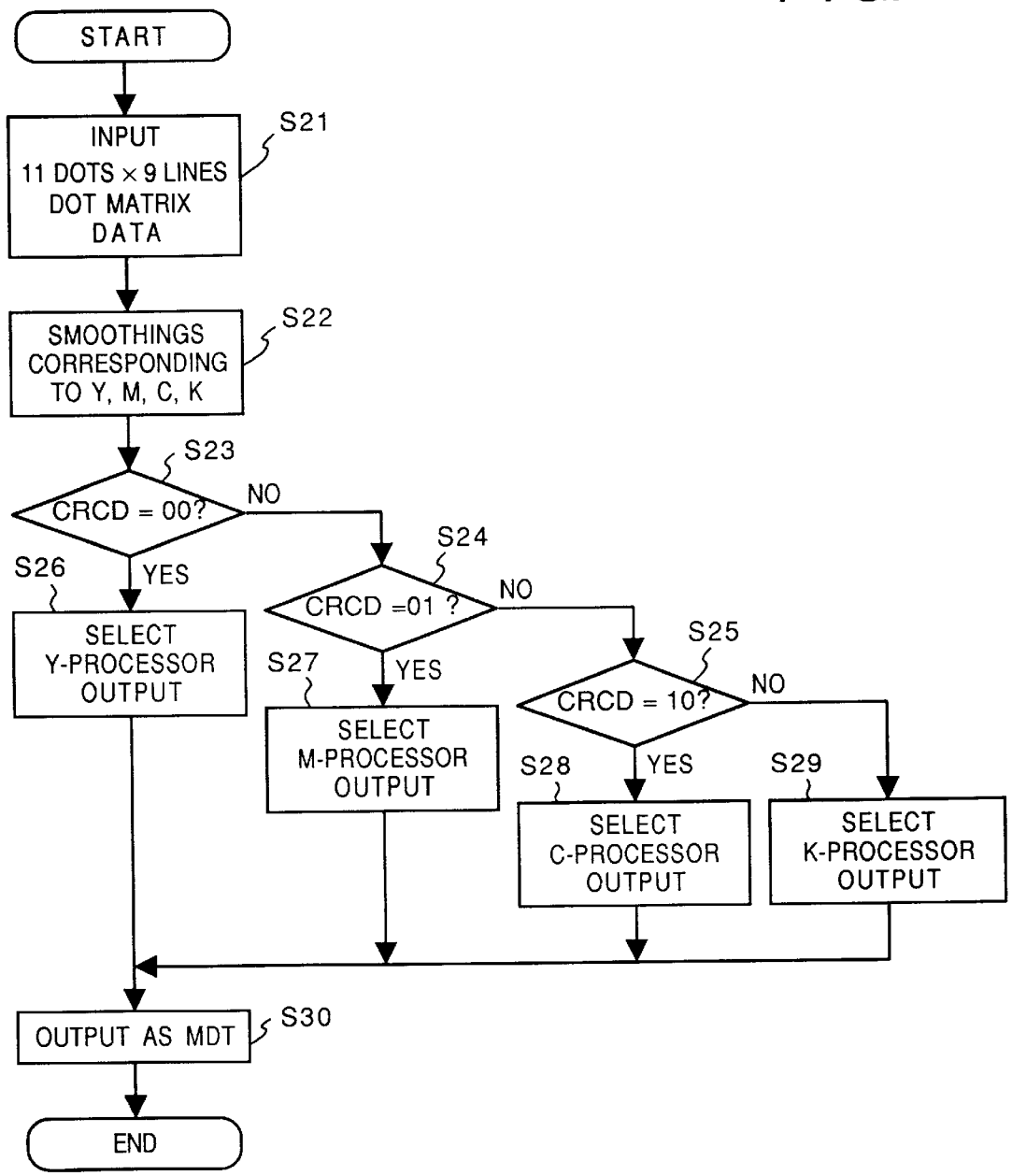
FIG. 11 is a flowchart showing the smoothing in the second embodiment.

The smoothing operation of the VDO signal processor 203 in the second embodiment will be described with reference to a flowchart of FIG. 11. In step S21, 11 dots×9 lines dot matrix data is inputted into the process units 47 to 50 respectively for the Y, M, C and K color components. In step S22, the process units 47 to 50 respectively perform smoothing using a smoothing logic appropriate to the corresponding color component.

In steps S23 to S25, the color of a currently-being processed data is determined and the process varies in accordance with the color. If CRCD="00", as the current VDO signal corresponds to the Y image, the process proceeds from step S23 to step S26, in which the selector 51 selects output pattern Xi from the Y-process unit 47, and outputs the data as MDT in step S30. Similarly, if CRCD= "01", the process proceeds from step S24 to step S27, in which the selector 51 selects output pattern Xi from the M-process unit 48. Similarly, if CRCD="10", output pattern Xi from the C-process unit 49 is selected, and if CRCD= "11", output pattern Xi from the K-process unit 50 is selected, and the selected data are outputted as the MDT signal.

As described above, according to the second embodiment, as smoothing processings respectively appropriate to the color components are executed, a higher-quality full-color recording image can be obtained.

[Third Embodiment]

Figure 12:
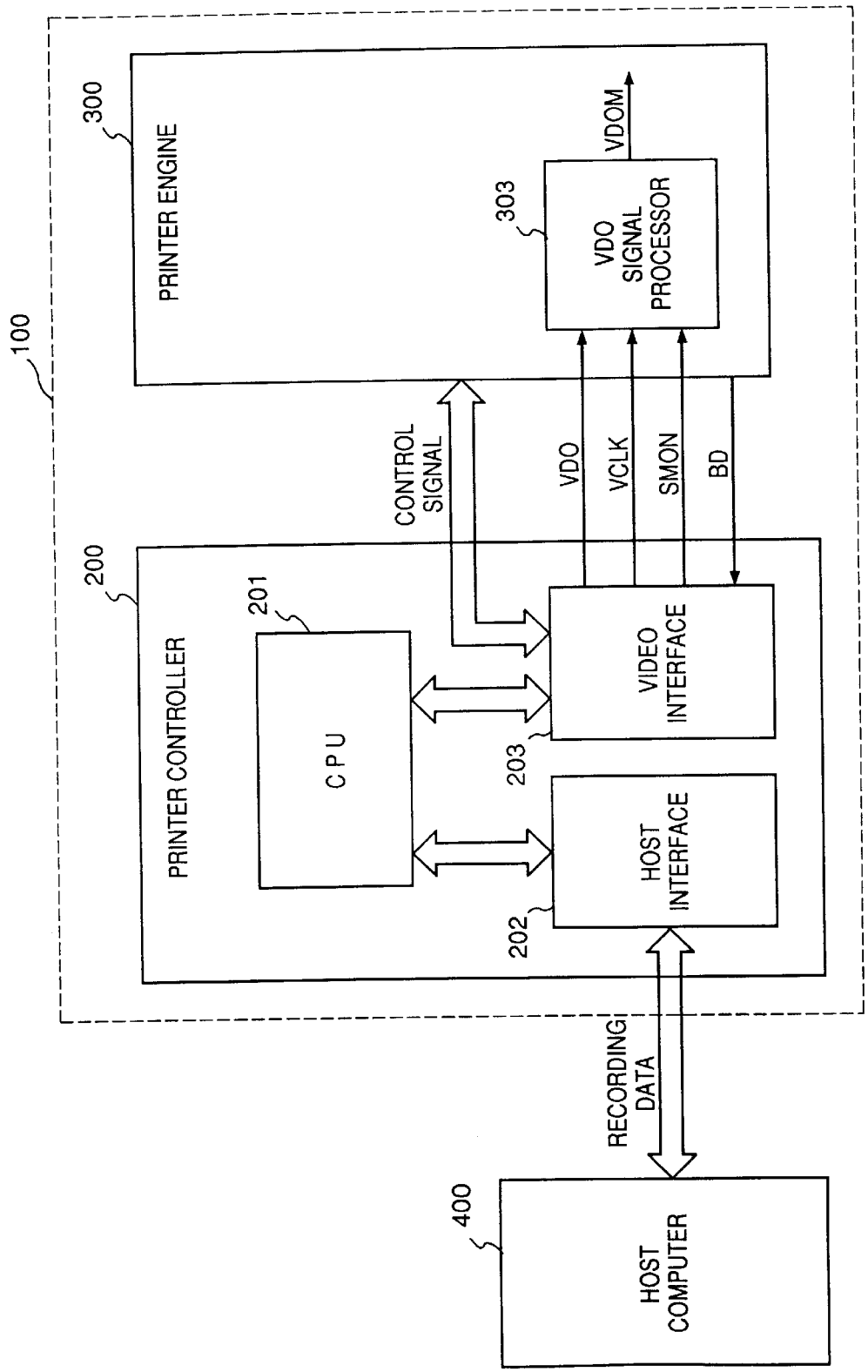
FIG. 12 is a block diagram showing the configuration of a control system of a color printer according to a third embodiment.

Next, an image processing apparatus according to the third embodiment will be described with reference to FIG. 12 showing the configuration of a control system of a color printer in the third embodiment. In FIG. 12, elements corresponding to these in FIG. 2 have the same reference numerals and the explanations of these elements will be omitted.

In FIG. 12, signal SMON is a smoothing signal. The signal SMON is ON (YES) when image data of a color component which needs smoothing is outputted; while the signal SMON is OFF (NO) when an image data of a color component which does not need smoothing is outputted.

Figure 13:
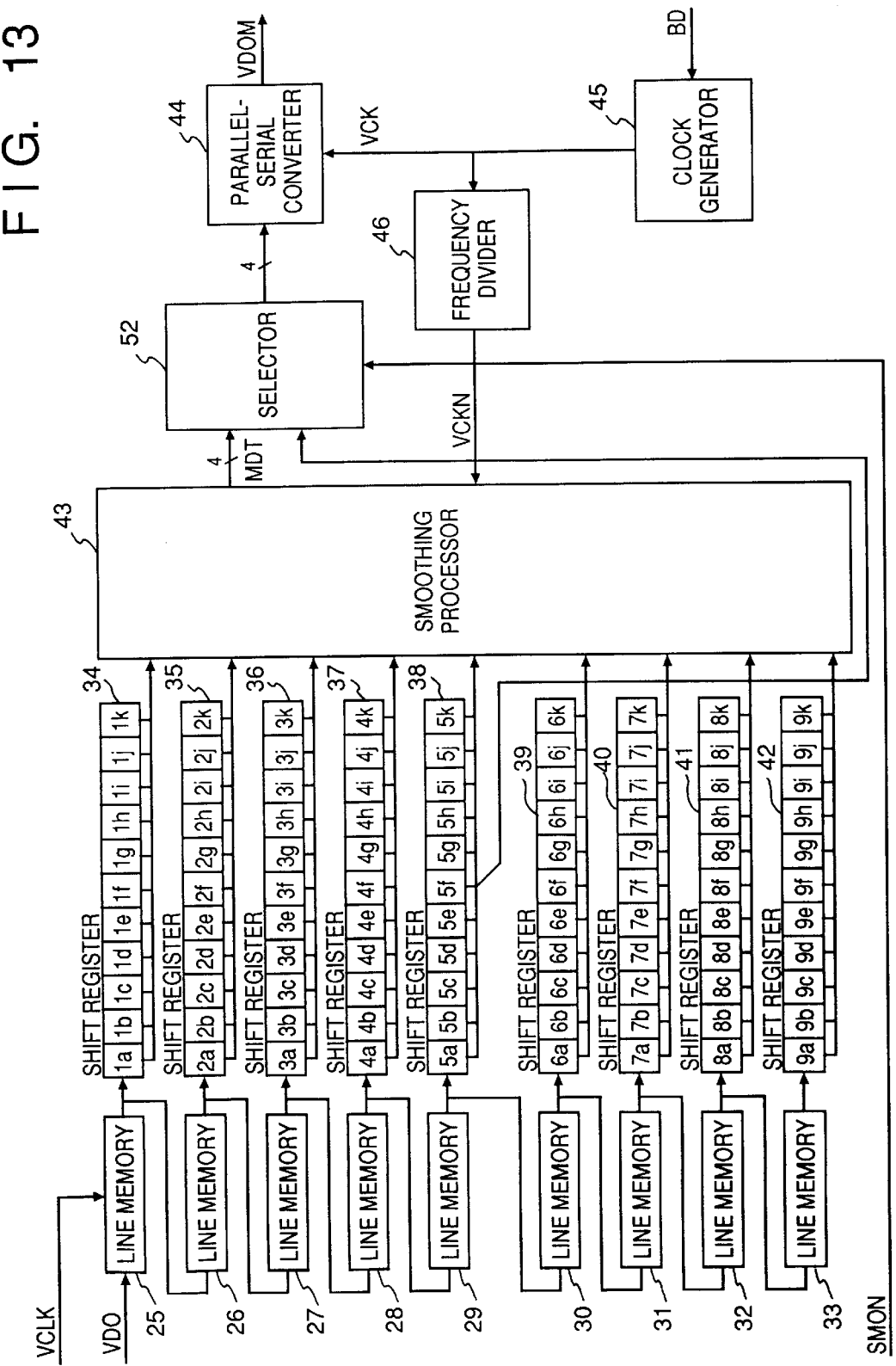
FIG. 13 is a block diagram showing the construction of a VDO signal processor in the third embodiment.

Next, VDO signal processor 303 in the third embodiment will be described below with reference to FIG. 13 showing the construction thereof. In FIG. 13, elements corresponding to these in FIG. 3 have the same reference numerals and the explanations of these elements will be omitted.

Reference numeral 52 denotes a selector which inputs the parallel signal MDT outputted from the smoothing processor 43 and the object pixel 5$f$ data (original pixel data). If the signal SMON is ON, the selector 52 selects the parallel signal MDT, while if the signal SMON is OFF, selects the original pixel data and outputs it.

The pixel data outputted from the selector 52 enters the parallel-serial converter 44, which converts the input pixel data into the serial signal VDOM as a video signal and outputs the signal to the laser driver (not shown) synchronizing with the clock VCK. As described above, the object pixel data is divided into four data in the smoothing processing, therefore the pixel data comprises four bits $X_1$ to $X_4$. Modulating-printing is performed as described above.

Figure 14:
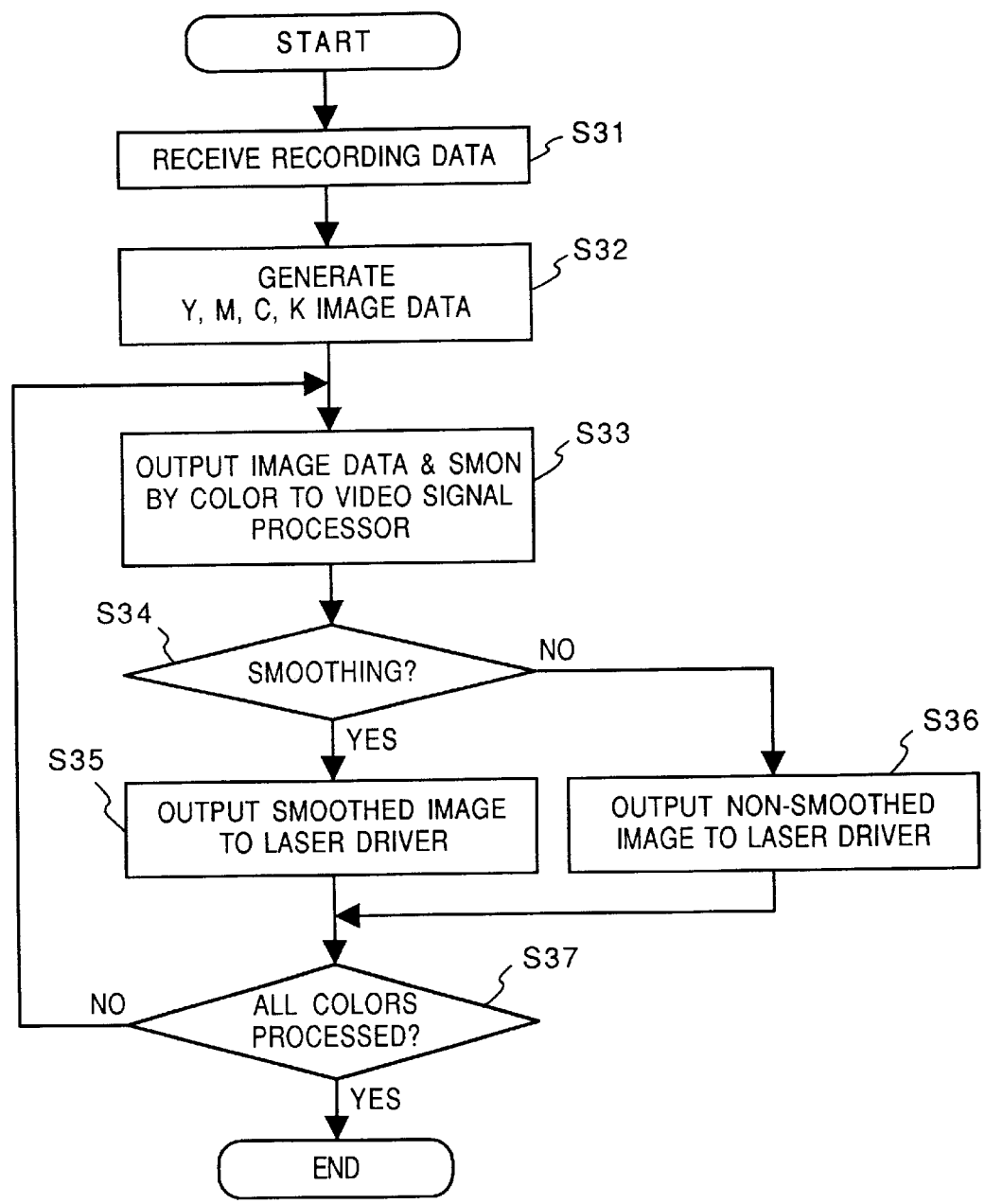
FIG. 14 is a flowchart showing the operation of the color printer in the third embodiment.

Next, the operations of the color printer having the above construction will be described with reference to a flowchart of FIG. 14.

Full-color recording data transferred from the host computer 400 includes a color-designation signal to designate the object of smoothing from the Y, M, C and K color components. In this embodiment, the recording data includes only a color-designation signal designating the K color component. The host interface 202 receives the recording data from the host computer 400 in step S31, and the CPU 201 generates bit map data (image data) for one page with respect to the Y, M, C and K color components in step S32.

Next, the video interface 203 sequentially transfers the image data for one page to the printer engine 300 in the order of Y, M, C and K in step S33. At this time, the signal SMON which indicates whether or not smoothing should be performed is outputted at outputting of each color component data. In this example, the smoothing signal SMON is OFF ("NO") when the Y, M and C image data are transferred, while it becomes ON ("YES") when the K image data is transferred.

It should be noted that steps S31 to S33 are performed by the printer controller 200 side, and from step S34 and the subsequent steps to be described below are performed by the VDO signal processor 303.

In step S34, whether smoothing is performed or not is determined by examining the smoothing signal SMON received with the image data. If the smoothing is performed (SMON is ON), the process proceeds to step S35, while if the smoothing is not performed (SMON is OFF), proceeds to step S36. Upon execution of smoothing, a video signal smoothed by the VDO signal processor 303 is outputted to the laser driver in step S35. On the other hand, if the smoothing is not performed, image data which has not been smoothed is outputted to the laser driver in step S36. In step S37, whether or not outputting of video signals of all the color components is over is determined. If YES, the process ends, while if NO, returns to step S33.

The process in steps S34 to S36 by the VDO signal processor 303 will be described in detail. The image data transferred from the video interface 203 is smoothed and inputted into the selector 52 as the parallel signal MDT. Also, the original pixel data which has not been smoothed is inputted into the selector 52. While the Y, M, and C image data are processed, the signal SMON is "NO", therefore, the selector 52 selects the original pixel data of the object pixel 5ƒ and outputs the data as the parallel signal MDT (step S35). When the K image data is inputted, as the signal SMON becomes "YES", the selector 52 selects the data from the smoothing processor 43 (parallel signal MDT) and outputs the MDT (step S36). As a result, only the K (black) image data is smoothed and recording is performed.

Under the above control, when the Y image data VDO from the printer controller 200 enters the VDO signal processor 303, the image data is converted into a video signal and a yellow image is transferred onto the recording paper 102. At this time, as the smoothing signal SMON is "NO", the smoothing is not executed. The recording paper 102 turns around the transfer drum 103. Next, when the M image data VDO from the printer controller 200 is received, the data is converted into a video signal and a magenta image is transferred onto the recording paper 102. The C image data VDO is processed in this manner. When the K image data VDO is received, the smoothing signal SMON becomes "YES", and the image data is smoothed. The smoothed data is converted into a video signal and a smoothing-processed black image is transferred onto the recording paper 102. The fixing unit 104 fixes the transferred images as a full-color image and the recording paper 102 is discharged.

It should be noted that the process in steps S31 to S33 is performed by the printer controller 200 and the process in steps S34 to 37 is performed by the printer engine 300. Accordingly, though the process serially flows in the flowchart, actually, the process includes parallel execution. For example, when the printer controller 200 finishes Y image formation, it outputs the image to the printer engine 300. While the Y image is recorded by the printer engine 300, the printer controller 200 processes the M image data inputted from the host computer 400 for Y image formation.

As described above, the third embodiment enables designation of execution/non-execution of smoothing from the host computer with respect to each of the Y, M, C and K colors, thus obtaining a desired print image.

In the first and second embodiments, the smoothing is performed on the image data of all color components. In this case, if one page includes a black character image and a yellow photograph image, the smoothing is performed on the picture image that does not require smoothing as well as the character image that requires smoothing. This may influence a full-color image to be formed. However, the third embodiment solves this problem.

In the explanation of the third embodiment, the K (black) image data is designated as an image to be smoothed. However,. another color image data can be designated as the object of smoothing, and further, a plurality of color image data can be designated as the objects of smoothing.

<Fourth Embodiment>

In the third embodiment, whether the smoothing is performed or not is designated with respect to each color component. In a printer according to the fourth embodiment, smoothing process logic is specified with respect to each color component, and upon image outputting, the level of each smoothing can be varied.

The color printer in the fourth embodiment has a construction substantially corresponding to that in the third embodiment shown in FIGS. 12 and 13. Accordingly, the different portions from the construction in the third embodiment will be described with reference to FIGS. 12 and 13.

In FIG. 12, the host computer 400 transfers a signal to designate a smoothing level by color component (referred to as "smoothing level signal") with image data for one page to the printer controller 200.

The printer controller 200 determines each smoothing level based on the received smoothing level signal by color component. Upon transferring bit map data of each color to the printer engine 100, the printer controller 200 changes the smoothing signal SMON in accordance with the determined smoothing level. In the fourth embodiment, the SMON is a two-bit signal for indicating four states of "smoothing level-high", "smoothing level-medium", "smoothing level-low", and "smoothing-not performed". In this embodiment, the SMON indicates "smoothing level-high" for the Y data; "smoothing-not performed" for the M data; "smoothing level-low" for the C data; and "smoothing level-medium" for the K data. In this case, the SMON signal value is respectively "11" (high), "00" (not performed), "01" (low) and "10" (medium).

In the fourth embodiment, the operations of the elements except the smoothing processor 43 and the selector 52 in FIG. 13 correspond to those according to the third embodiment, and therefore the explanations of these elements will be omitted. The operations of the smoothing processor and selector according to the present embodiment will be described below with reference to FIG. 15.

Figure 15:
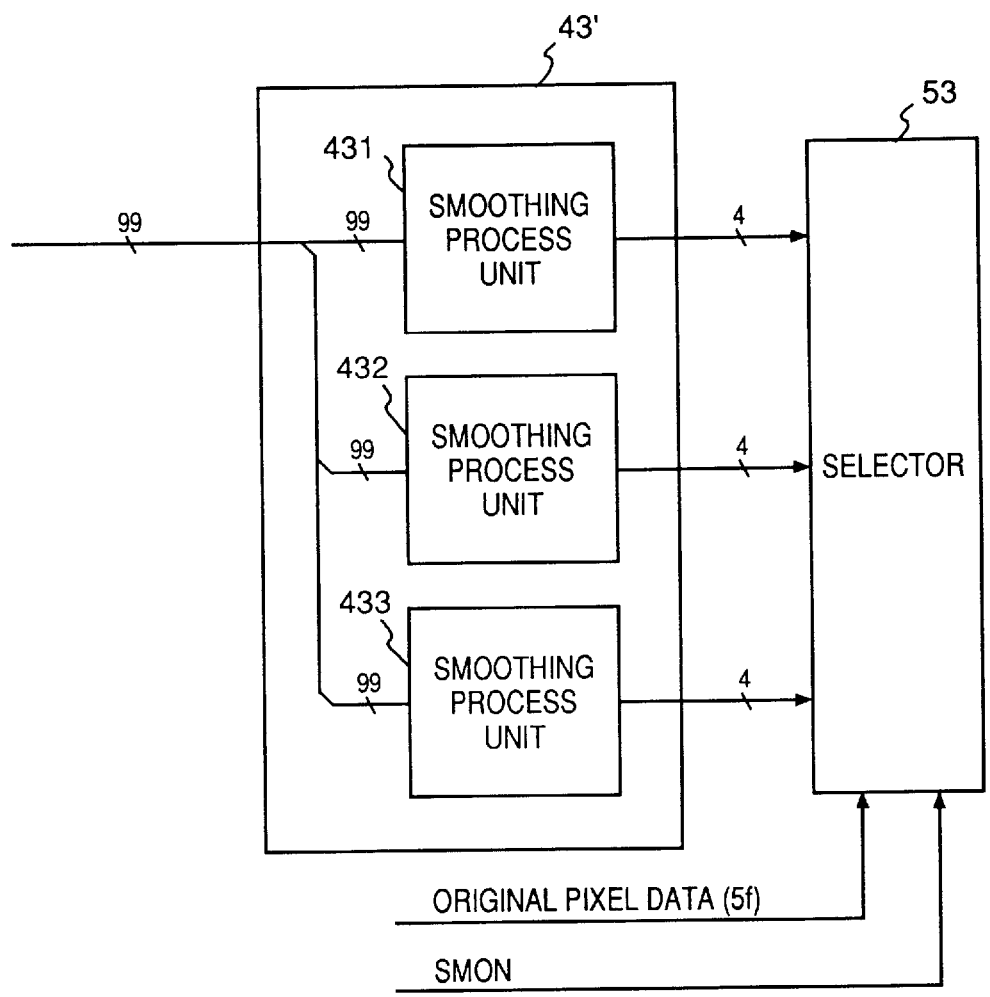
FIG. 15 is a block diagram showing the construction of a smoothing processor according to a fourth embodiment.

FIG. 15 is a block diagram showing the construction of smoothing processor 43' in the fourth embodiment. In FIG. 15, reference numerals 431 to 433 denote smoothing process units having smoothing logics of different smoothing levels. The process unit 431 has a smoothing logic for high-level smoothing; the process unit 432, for medium-level smoothing; and the process unit 433, for low-level smoothing.

The smoothing process units 431 to 433 respectively output four-bit image data obtained from smoothing upon the object pixel 5ƒ based on the respective bit data from the shift registers 34 to 42 (i.e. 99 bit data of 1a–9k). Accordingly, the smoothing processor 43 outputs three kinds of image data which have been smoothed in the different levels. That is, the three of the four-bit image data from the smoothing process units 431 to 433 enter selector 53.

Further, the selector 53 inputs the original pixel data of the object pixel 5ƒ, similarly to the selector 52 in the third embodiment. The selector 53 outputs either any of the four-bit image data or the original pixel data.

In accordance with the present embodiment, upon smoothing the Y data, as the smoothing level is high, the selector 53 selects the output from the smoothing process unit 431. Regarding the M data, the selector 53 outputs the original pixel data (the object pixel 5ƒ signal); regarding the C data, the output from the process unit 433; and regarding the K data, the output from the process unit 432.

It should be noted that in the smoothing logics used by the smoothing process units 431 to 433, the smoothing level is varied as described in the second embodiment. For example, with respect to a pattern as shown in FIG. 4E, the smoothing process unit 431 uses a logic as shown in FIG. 10A; the process unit 432, a logic as shown in FIG. 10B; and the process unit 433, a logic as shown in FIG. 4E.

Figure 16:
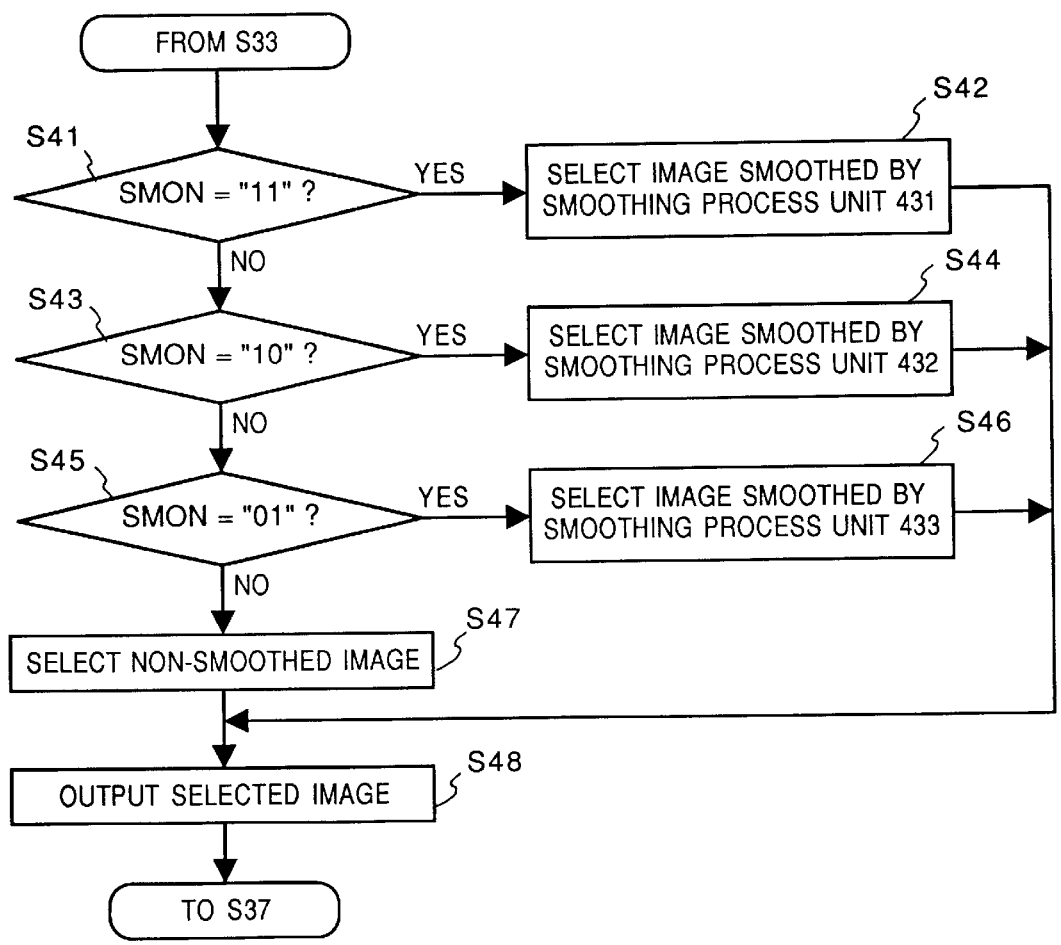
FIG. 16 is a flowchart showing the operation of the color printer in the fourth embodiment.

The above processing will be described in detail with reference to a flowchart in FIG. 16. Note that the flowchart of FIG. 16, which shows the characteristic feature of the fourth embodiment, corresponds to steps S34 to S36 in the flowchart in FIG. 14.

After executing steps S31 to S33, the process advances to step S41. In step S41, if SMON="11", the selector 51 selects the image smoothed by the smoothing process unit 431 in step S42, and the process advances to step S48. If NO in step S41, the process proceeds to step S43. If SMON="10", the process proceeds to step S44, in which the selector 53 selects the image data smoothed by the smoothing process unit 432, and the process advances to step S48. If NO in step S43, the process proceeds to step S45. If SMON="01", the process proceeds to step S46, in which the selector 53 selects the image data smoothed by the smoothing process unit 433, and the process advances to step S48. If NO in step S45, it is judged that SMON="00", and the process proceeds to step S47, in which the selector 53 selects the non-smoothed image data (original pixel data), and the process proceeds to step S48. In step S48, the image data selected by the selector 53 is outputted to the laser driver, and the process proceeds to step S37 in FIG. 14.

As described above, according to the fourth embodiment, the host computer side can designate a desired smoothing level for each color image, thus realizing fine smoothing control.

<Fifth Embodiment>

In the third and fourth embodiments, the smoothing is controlled with a signal from the host computer 400. In this embodiment, a color printer in which the smoothing is automatically controlled depending upon its operation environment (humidity within the apparatus and potential of the electrostatic drum in the present embodiment) will be described.

Figure 17:
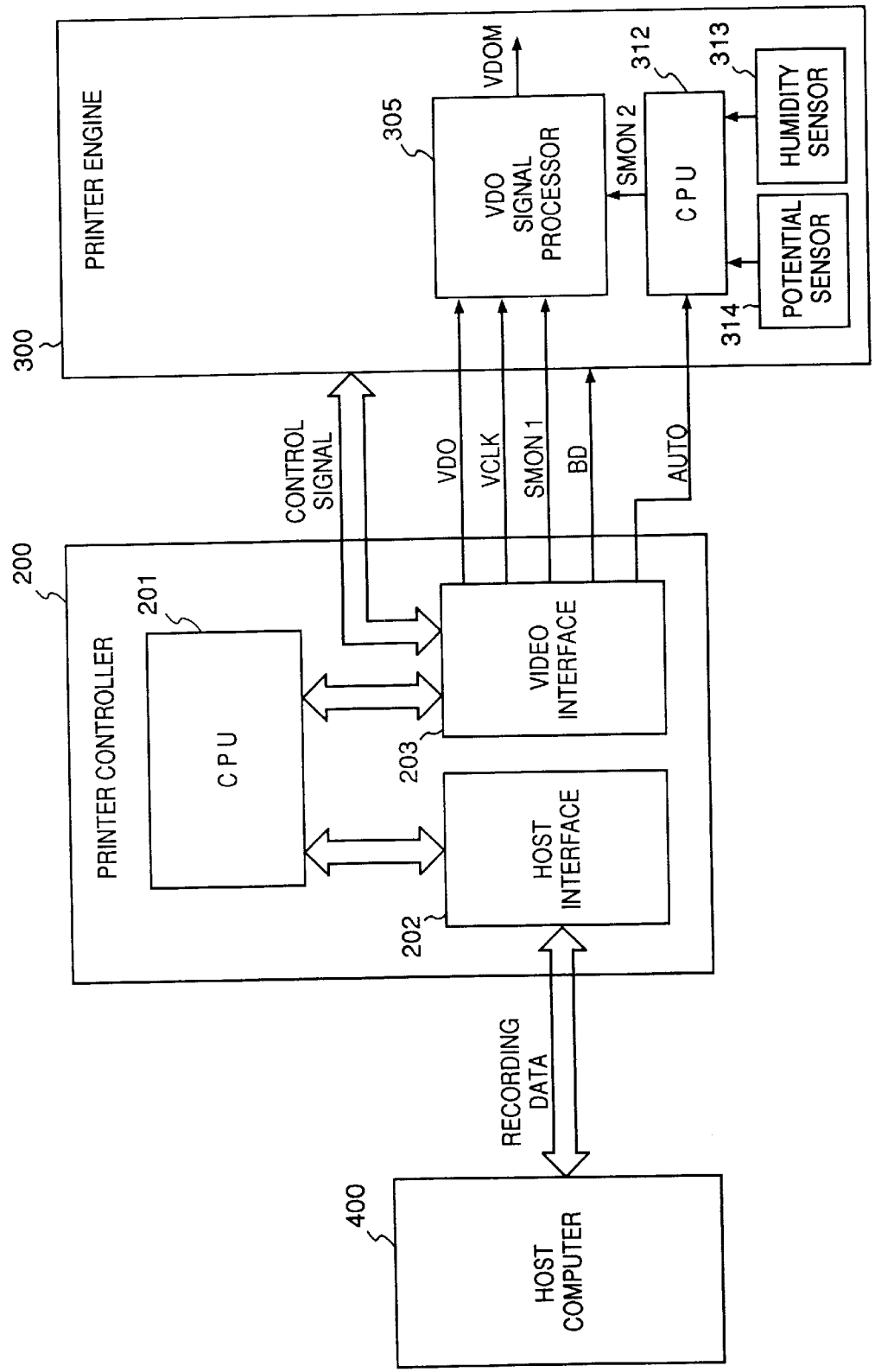
FIG. 17 is a block diagram showing the configuration of a control system of a color printer according to a fifth embodiment.

FIG. 17 is a block diagram showing the configuration of a control system of the color printer according to the fifth embodiment. It should be noted that elements having functions similar to those in FIG. 12 have the same reference numerals and the explanations of these elements will be omitted.

In FIG. 17, if mode signal AUTO transferred from the printer controller 200 is ON ("YES"), CPU 312 in the printer engine 300 outputs SMON 2 based on outputs from humidity sensor 313 and potential sensor 314 of the electrostatic drum 1 to video signal processor 305 so as to select the most appropriate process unit. For example, as recording image density tends to be high when the humidity is high, the CPU 312 outputs the SMON 2 to lower the smoothing level. Since the recording image density tends to be low when the electrostatic drum potential is low, the CPU 312 outputs the SMON 2 to raise the smoothing level. If the AUTO is OFF ("NO"), the processing in the fourth embodiment is performed. That is, smoothing level signal SMON 1 (corresponding to SMON in the fourth embodiment) from the printer controller 200 is transferred to the printer engine 300 so that the VDO signal processor 305 will perform smoothing in accordance with the SMON 1.

Figure 18:
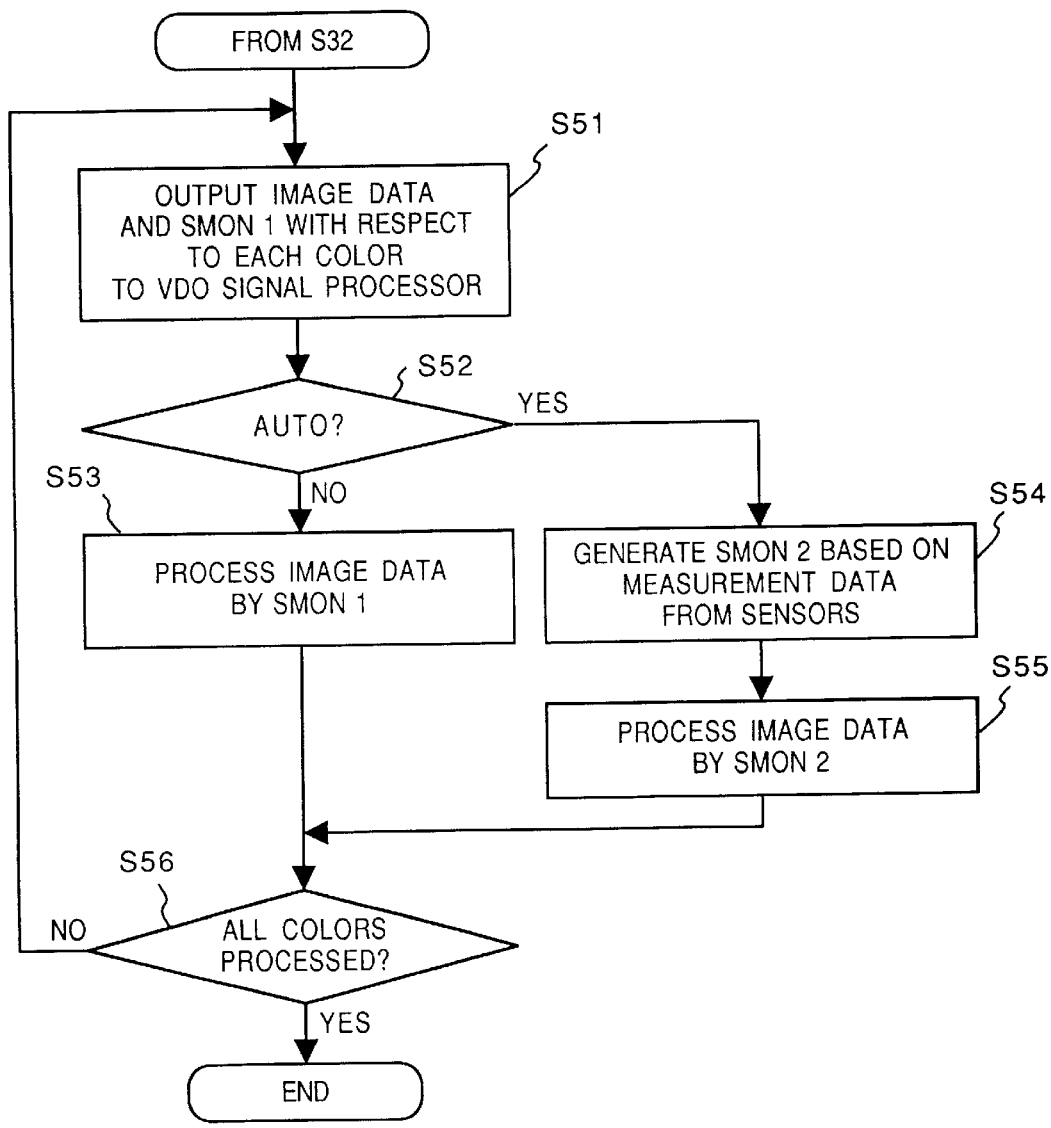
FIG. 18 is a flowchart showing the operation of the color printer in the fifth embodiment.

The above processing will be described in detail with reference to a flowchart in FIG. 18. The flowchart of FIG. 18 shows the operations in steps S33 to S37 in the flowchart of FIG. 14.

After executing steps S31 to S32, the process advances to step S51. In step S51, the video interface 203 outputs the image signal VDO and the SMON 1 with respect to each color component. In step S52, the state of the AUTO is examined. If it is "YES", the process proceeds to step S54, while if "NO", proceeds to step S53. In step S53, the aforementioned operations in steps S41 to S48 in FIG. 16 are performed using the SMON 1 inputted in step S51. On the other hand, in step S54, the SMON 2 is generated for setting the smoothing level based on the measurement data from the humidity sensor 303 and the potential sensor 304. In step S55, the aforementioned operations in steps S41 to S48 are performed using the SMON 2.

In step S56, whether or not outputting of video signals of all the color components is over is determined. If YES, the process ends, while if NO, returns to step S51.

As described above, according to the fifth embodiment, detecting the recording operation environment enables the most appropriate smoothing. This reduces users' operating load by omitting smoothing level designation.

It should be noted that in the fifth embodiment, the selection of smoothing with the SMON 1 or the SMON 2 is made based on the ON/OFF of the AUTO, however, this does not pose any limitation upon the present invention. For example, in a case where the AUTO signal is "YES", if the humidity is high, the smoothing level designated from the host computer 400 can be lowered (e.g., when SMON 1="11", the output SMON 2 is "10"). That is, the SMON 1 can be modified in accordance with operation environment.

Further, in the fifth embodiment, the humidity within the apparatus and the electrostatic drum potential are used as factors of recording operation environment, however, the operation environment is not limited to these factors. Any factor that influences the recording state, e.g. temperature within the apparatus, can be used.

Further, the smoothing method employed in the embodiments is to detect an object pixel to be smoothed based on the 9×11 dot information, then divide the object pixel by four, and change pixel data. However, various smoothing processing methods as well as the above method can be employed.

In the second, fourth and fifth embodiments, the plurality of smoothing process units realize the plurality of smoothing logics, and the selector selects one of the obtained plurality of smoothed image data. However, this is merely one construction embodying the present invention. It can be arranged such that one smoothing process unit is employed by changing the smoothing logics.

Similarly, in the third embodiment, the smoothing processor 43 may determine whether or not smoothing is performed in accordance with the SMON in place of the selector 52.

As described above, the present invention provides a full-color printer which obtains a high-image-quality processed image by performing smoothings upon respective color components.

Further, the present invention enables appropriate smoothing upon each color image data in accordance with the visual sensitivity difference among colors and prevents image degradation due to unnecessary smoothing.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

storage means for storing color image data by color component;

smoothing means for smoothing the color image data by color component; and changing means for changing a logic for smoothing used by said smoothing means by color component.

2. An image processing apparatus comprising:

storage means for storing color image data by color component;

smoothing means having a plurality of smoothing processors for smoothing the respective color image data by different logics by color component, for smoothing the respective color image data by the plurality of smoothing processors, and obtaining plural kinds of output image data; and output means for selecting one of the plural kinds of output image data obtained by said smoothing means based on the color component of the image data processed by said smoothing means, and outputting the selected image data.

3. An image processing apparatus comprising:

storage means for storing color image data by color component;

designation means for designating a smoothing level with respect to each of the color image data;

smoothing means for changing a level of smoothing by color image data in accordance with the smoothing level designated by said designation means; and output means for outputting the color image data smoothed by said smoothing means.

4. An image processing apparatus comprising:

storage means for storing color image data by color component;

designation means for designating a smoothing level by color image data;

smoothing means for, upon forming images of the color image data, smoothing the respective color image data at a plurality of smoothing levels, and obtaining plural kinds of output image data; and output means for selecting one of the plural kinds of output image data in accordance with the smoothing level of the color image data designated by said designation means.

5. The apparatus according to claim 4, wherein said designation means inputs information to designate the smoothing level of one of the color image data from an external device by color component.

6. An image processing method comprising:

a storage step of storing color image data by color component;

a smoothing step of smoothing the color image data by color component; and a changing step of changing a logic for smoothing used in said smoothing step by color component.

7. An image processing method comprising:

a storage step of storing color image data by color component;

a smoothing step, in which a plurality of smoothing processors for smoothing the respective color image data by different logics by color component are used, of smoothing the respective color image data by the plurality of smoothing processors, and obtaining plural kinds of output image data; and an output step of selecting one of the plural kinds of output image data obtained in said smoothing step based on the color component of the image data processed in said smoothing step, and outputting the selected image data.

8. An image processing method comprising:

a storage step of storing color image data by color component;

a designation step of designating a smoothing level with respect to each of the color image data;

a smoothing step of changing a level of smoothing by color image data in accordance with the smoothing level designated in said designation step; and an output step of outputting the color image data smoothed in said smoothing step.

9. An image processing method comprising:

a storage step of storing color image data by color component;

a designation step of designating a smoothing level by color image data;

a smoothing step of, upon forming images of the color image data, smoothing the respective color image data at a plurality of smoothing levels, and obtaining plural kinds of output image data; and an output method of selecting one of the plural kinds of output image data in accordance with the smoothing level of the color image data designated in said designation step.

* * * * *

UNITED STATES PATENT AND TRADEMARK OFFICE
CERTIFICATE OF CORRECTION

PATENT NO. : 5,854,689

DATED : December 29, 1998

INVENTOR(S) : Tetsuo SAITO

It is certified that error appears in the above-identified patent and that said Letters Patent is hereby corrected as shown below:

COLUMN 3:
 Line 47, "magenta, cyan" should read --cyan, magenta--.

COLUMN 4:
 Line 54, delete "have".

COLUMN 6:
 Line 11, "103, next," should read --103. Next,--.

COLUMN 8:
 Line 8, "while" should be deleted.

COLUMN 9:
 Line 60, "However,." should read --However,--.

Signed and Sealed this

Twenty-first Day of September, 1999

Attest:

Q. TODD DICKINSON

*Attesting Officer*  *Acting Commissioner of Patents and Trademarks*